United States Patent [19]

Miller et al.

[11] Patent Number: 5,410,126
[45] Date of Patent: Apr. 25, 1995

[54] PORTABLE AC/DC WIRE FEED WELDER

[76] Inventors: Norman O. Miller; Nathan O. Miller, both of 7130 E. 7 Mile Rd., Evart, Mich. 49631

[21] Appl. No.: 236,586

[22] Filed: May 2, 1994

[51] Int. Cl.⁶ .............................................. B23K 9/10
[52] U.S. Cl. ................................................ 219/130.1
[58] Field of Search .................... 219/130.1, 133, 134, 219/132

[56] References Cited

U.S. PATENT DOCUMENTS

| | | | |
|---|---|---|---|
| 4,508,954 | 4/1985 | Kroll | 219/132 |
| 4,590,357 | 5/1986 | Winkler | 219/130.1 |
| 4,705,934 | 11/1987 | Winkler | 219/137 PS |
| 4,801,780 | 1/1989 | Hayes | 219/130.1 |
| 5,086,208 | 2/1992 | Habermann | 219/130.1 |
| 5,250,786 | 10/1993 | Kikuchi et al. | 219/133 |
| 5,260,545 | 11/1993 | West et al. | 219/130.1 |

FOREIGN PATENT DOCUMENTS 2333594 1/1975 Germany ........................ 219/130.1

Primary Examiner—Clifford C. Shaw
Attorney, Agent, or Firm—David L. Baker; Rhodes & Ascoullo

[57] ABSTRACT

In a preferred embodiment, a portable wire feed electric arc welder, including a cabinet, a welding gun connected to the cabinet through a flexible conduit, and a supply mechanism to continuously feed the wire to the welding gun. There is a mechanism to receive either AC or DC power into the welder and a selector mechanism to selectively switch between a first mode of operation in which welding is performed with an external DC source, a second mode of operation in which welding is performed with an external AC source, and a third mode of operation in which welding is performed with an internal AC source. The internal AC source includes a step-down transformer connected to a conventional 115 VAC power source.

4 Claims, 6 Drawing Sheets

X = CONTACTS CLOSED

CONTACTS

| SELECTOR SWITCH POSITION | S1 | S2 | S3 | S4 |
|---|---|---|---|---|
| DC |  | X |  |  |
| AC | X |  |  |  |
| INT | X |  | X | X |

PORTABLE AC/DC WIRE FEED WELDER

BACKGROUND OF THE INVENTION

1. Field of the Invention

The present invention relates to wire feed welders generally and, more particularly, but not by way of limitation, to a novel, highly portable electric arc field welder that can be selectively operated on either direct or alternating current.

2. Description of the Related Art

U.S. Pat. No. 4,508,954, issued Apr. 2, 1985, to Kroll, describes a AC/DC welder which includes a voltage control that receives whatever AC or DC voltage is used for welding and produces therefrom a low voltage DC current which is used, in part, for powering welder controls and a wire feed mechanism, the object being to eliminate the usual 115-VAC line to the wire feed mechanism.

U.S. Pat. No. 4,590,357, issued May 20, 1986, to Winkler, describes a vehicular arc welder which receives its power from the vehicle's battery charger. The output of the charger is fed to a battery charger which is connected to charge a set of batteries. When welding is being performed, current is drawn from both the batteries and the battery charger. When welding is not being performed, the output of the charger charges the batteries. A range of welding voltages is available.

U.S. Pat. No. 4,705,934, issued Nov. 10, 1987, to Winkler, describes a vehicular arc welder similar in pertinent respects to the '357 patent above.

U.S. Pat. No. 4,801,780, issued Jan. 31, 1989, to Hayes, describes an MIG welder attachment for a conventional 115-VAC variable-speed electric drill. The attachment employs a 24-VDC source for welding current.

U.S. Pat. No. 5,086,208, issued Feb. 4, 1992, to Habermann, describes a hand held portable arc welder which is powered entirely by storage batteries.

Most welding operations must be conducted in an area, such as a garage, where a convenient power source is readily available. Those welding machines which are, however, capable of operation on portable DC power sources, such as batteries, are limited in that they can only weld objects of relatively small thicknesses.

A need therefore exists for a highly portable electric arc field welder that is simple and that can selectively operate on either AC or DC current.

Accordingly, it is a principal object of the present invention to provide an electric arc field welder that is highly portable.

It is a further object of the invention to provide such a welder that is simple in construction.

It is an additional object of the invention to provide such a welder that can be selectively operated on either AC or DC current.

It is another object of the invention to provide such a welder that is economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a portable wire feed electric arc welder, including a cabinet, a welding gun connected to the cabinet through a flexible conduit, and a supply mechanism to continuously feed the wire to the welding gun. There is a mechanism to receive either AC or DC power into the welder and a selector mechanism to selectively switch between a first mode of operation in which welding is performed with an external DC source, a second mode of operation in which welding is performed with an external AC source, and a third mode of operation in which welding is performed with an internal AC source. The internal AC source includes a step-down transformer connected to a conventional 115 VAC power source.

Preferably, in the first mode of operation, the supply mechanism is operated by 12-VDC power furnished from an external source. In the second and third modes of operation, the supply mechanism is operated by 12-VDC power furnished from an internal AC/DC converter.

The selector mechanism further includes a selector switch having a plurality of contacts associated therewith. A 12 VDC control circuit has a first relay coil connected in series with a first set of the contacts, and a 115 VAC control circuit having a second relay coil connected in series with a first set of relay contacts associated with the first relay coil. The second relay coil is energized and closes a second set of relay contacts whenever the first set of relay contacts is closed by energization of the first relay coil. A second set of contacts is connected in parallel with the second set of relay contacts associated with the second relay coil, both of which are connected in series between a power source and a positive welding conductor. A third set of contacts is connected to the primary side of the step-down transformer and a fourth set of contacts is connected to the secondary of the step-down transformer. In the first mode of operation, the selector switch is placed in a first position, causing the second set of contacts to be closed, thereby creating electric potential at the positive welding conductor. In the second mode of operation, the selector switch is placed in a second position, causing the first set of contacts to be closed, thereby creating electric potential at the positive welding conductor only when the first relay coil is energized. Finally, in the third mode of operation, the selector switch is placed in a third position, causing the first, third, and fourth sets of contacts to be closed, thereby creating electric potential at the positive welding conductor only when the first relay coil is energized.

Preferably, the supply mechanism to feed the wire to the welding gun includes a rotatable supply spool from which the wire can be drawn, a rotatable drive wheel driven by a wire feed motor to engage a first side of the wire and draw the wire from the supply spool, and a rotatable pressure wheel to engage and bear against a second side of the wire, opposite the first side, to maintain firm engagement of the wire with the drive wheel.

Finally, the pressure wheel is rotatably mounted at the distal end of an arm, which is rotatably attached to a cabinet in which the supply mechanism is mounted. The pressure wheel is biased against the wire by a spring compressably disposed between an intermediate portion of the arm and the cabinet.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which.

DESCRIPTION OF THE PREFERRED EMBODIMENT

Figure 1:
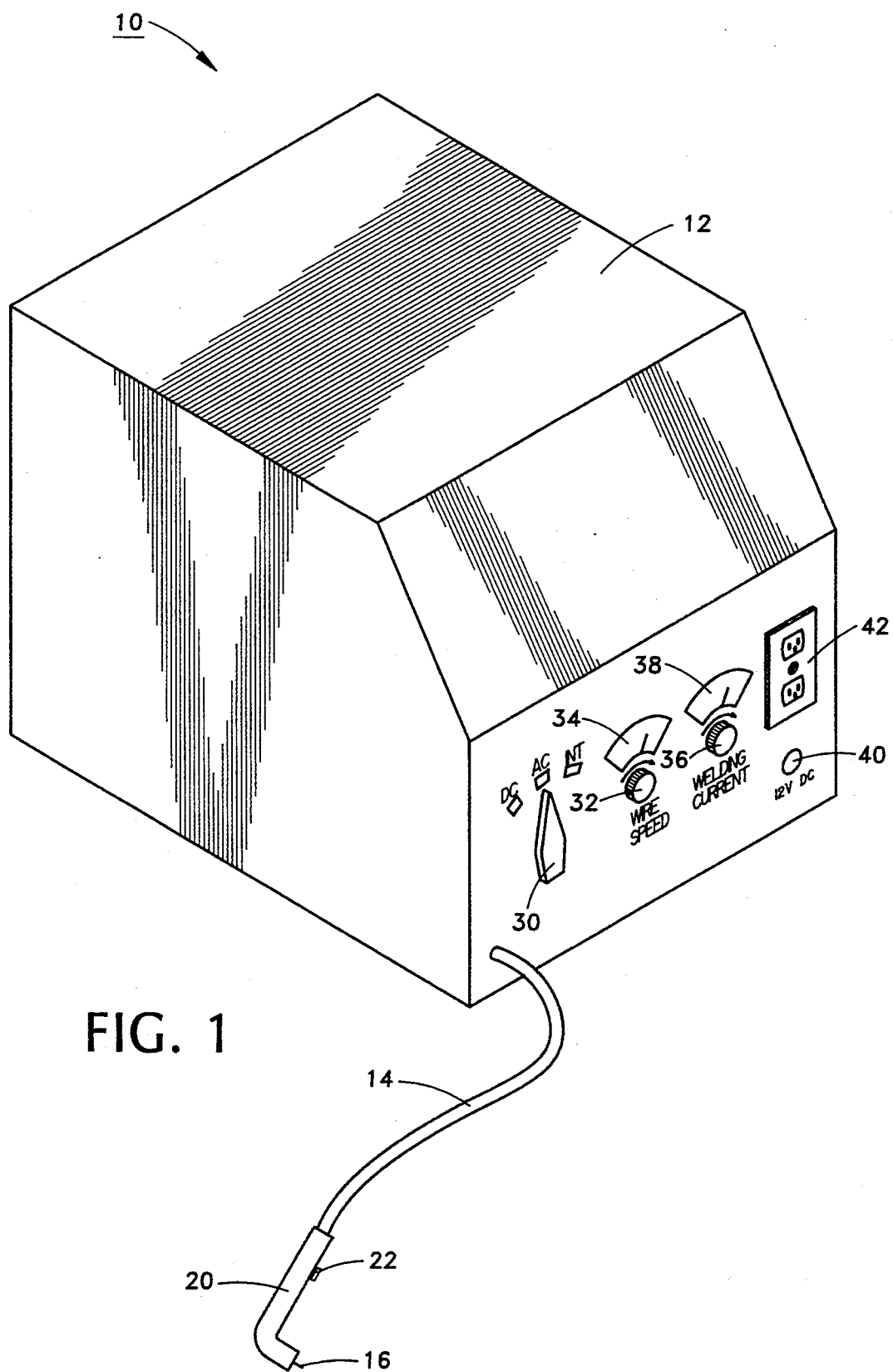
FIG. 1 is an isometric view of a welder according to the present invention.

Reference should now be made to the drawing figures, on which similar or identical elements are given consistent identifying numerals throughout the various figures, and on which parenthetical references to figure numbers direct the reader to the view(s) on which the element(s) being described is (are) best seen, although the element(s) may be seen also on other views.

FIG. 1 illustrates a welder according to the present invention, generally indicated by the reference numeral 10. Welder 10 includes a cabinet 12 from the front face of which extends a flexible conduit 14 containing a positive welding conductor in the form of a consumable metal wire electrode 16, the tip of which is seen extending from the distal end of a welding gun 20 attached to the distal end of the conduit 14. A gun switch 22 extends from the grip portion of welding gun 20 and can be depressed when the welding gun is manually gripped for use.

Mounted on the face of cabinet 12 is a selector switch 30, a wire speed control knob 32 and meter 34, a welding current control knob 36 and meter 38, a 12-VDC utility receptacle 40, and a 115-VAC utility outlet 42.

Figure 2:
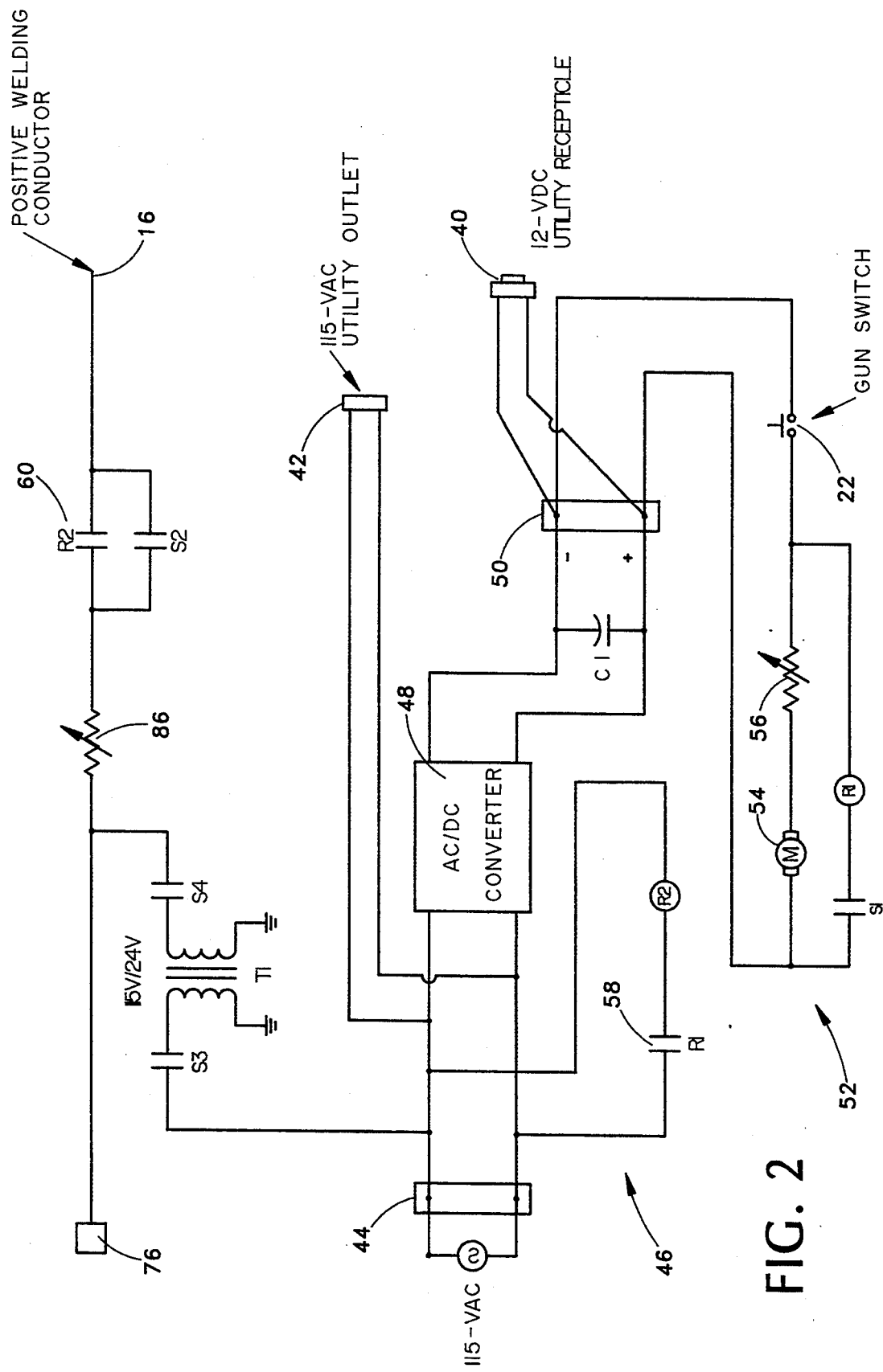
FIG. 2 is a schematic/block diagram of electrical circuitry and controls for the welder.

FIG. 2 illustrates the electrical and control circuitry for welder 10. 115 VAC power from a conventional utility source is fed to a first terminal board 44, which, in turn, supplies four main loads: a 115 VAC control circuit 46, the 115 VAC utility outlet 42, an AC/DC converter 48 for supplying 12 VDC power, and a step-down transformer T1 for supplying welding current to the wire 16. A second terminal board 50 is supplies power to a 12 VDC control circuit 52, as well as the 12 V utility receptacle, which is of the type conventionally used in automobiles to energize cigarette lighters.

The 12 VDC control circuit 52 includes a wire feed motor 54 connected in series with a first rheostat 56 for variably controlling the speed of motor 54, the position of rheostat 56 being set by the wire speed control knob 32 (FIG. 1). The wire feed motor is energized upon closing of the gun switch 22. Additionally, a first relay coil R1 is connected in parallel across the wire feed motor 54 and associated rheostat 56. Energization of the first relay coil R1 will cause an associated set of relay contacts 58, located in the 115 VAC control circuit 46, to close and energize a second relay coil R2 which also has an associated set of relay contacts 60.

The welder 10 has three distinct modes of operation, depending on the types of power sources available and the physical location of the welding tasks to be performed. In a first mode of operation, it will be assumed that there are no convenient sources of utility power available and that the user has only a 24 VDC power source available (a pair of car batteries, for example). External connections will be similar to those illustrated in FIG. 5. A pair of serially connected batteries 70 and 72 supply the 24 VDC welding current used in this mode of operation. A positive cable 74 connects the positive terminal of battery 72 to a power receiving terminal post 76 located in the back of welder 10, while a ground cable 78 connects the negative terminal of battery 70 to the workpiece 80 on which welding is to be performed.

Figure 5:
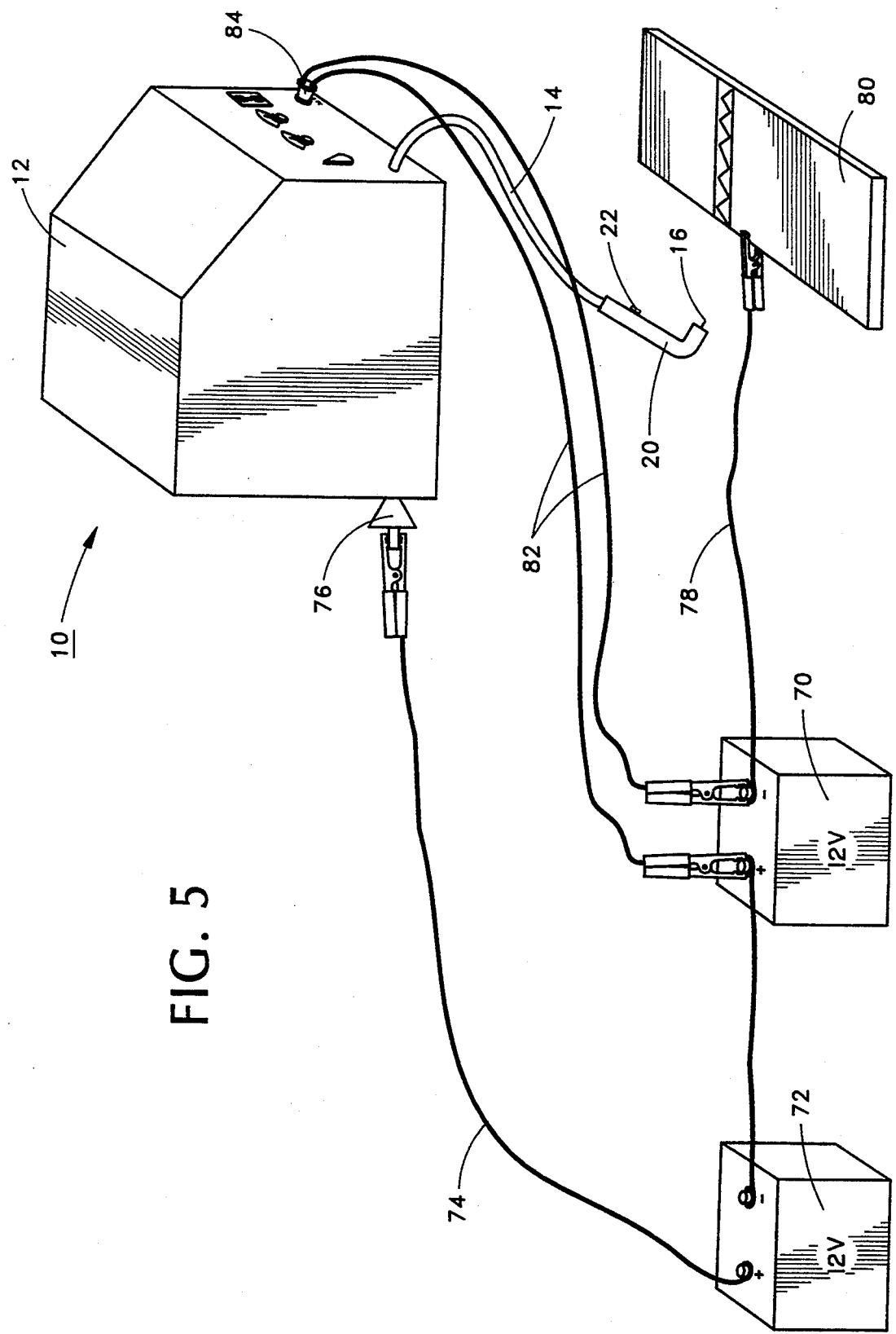
FIG. 5 is an isometric view of the welder in use in a DC current mode.
Figure 6:
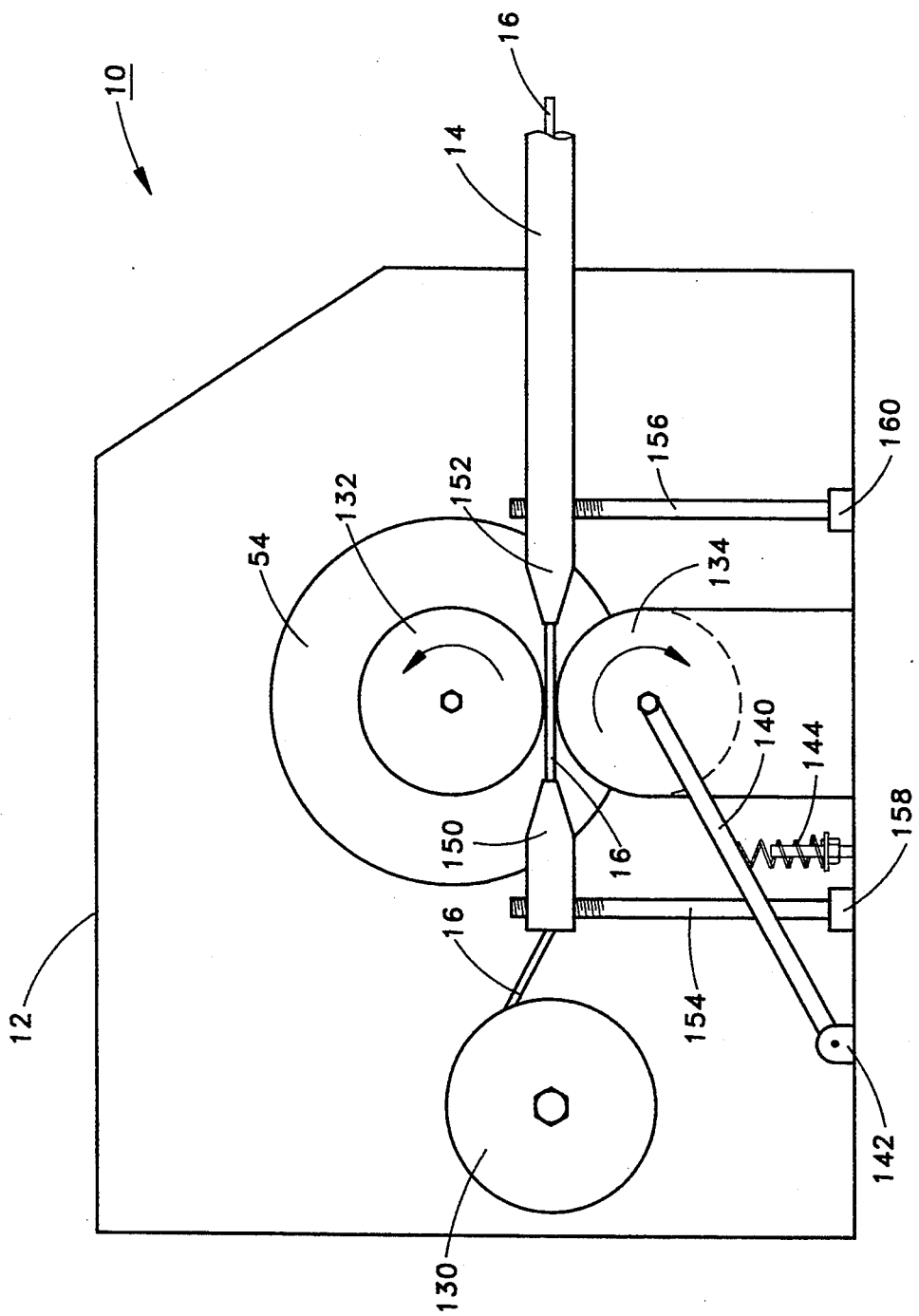
FIG. 6 is a cutaway, side elevational view of the wire feed mechanism of the welder.

Because there is no convenient 115 V source available, the required 12 VDC control power can not be generated via the AC/DC converter 48. Thus, it is necessary to use one of the batteries 70 as a means of introducing control power into the unit. As shown in FIG. 5, a pair of cables 82 is connected across the terminals of battery 70, terminating in a connector 84, with the connector being plugged into the 12 VDC utility receptacle 40. In this manner, 12 VDC control power is available at terminal board 50.

Figure 3:
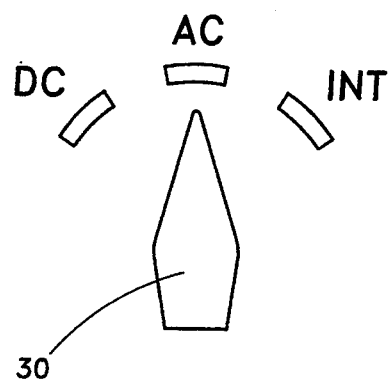
FIG. 3 is a table which illustrates the switching function of the selector switch according to the present invention.

To use the welder 10 in this first mode of operation, the selector switch 30 is placed in the "DC" position (FIG. 3). As illustrated by FIG. 3, only the switch contacts designated S2 will be closed. Referring once again to FIG. 2, it will be seen that by closing contacts S2, electric potential is created at the positive welding conductor 16 from the power receiving terminal post 76 through a current controlling rheostat 86 and now closed contacts S2. This condition is called a "hot tip" in the art, as welding can commence when the positive electrode (wire 16) is brought into proximity with the grounded work piece 80, thereby striking an electric welding arc.

In a second mode of operation, it will be assumed that a 115 VAC utility source is available, as well as an external source of AC welding current. In this mode, external connections will be similar to those illustrated in FIG. 4. Welding current is supplied by a conventional non-wire feed AC welder 90, having a positive cable 92 connected to the power receiving terminal post 76 in the back of the welder 10 and a negative cable 94 connected to the workpiece 80.

To use the welder 10 in the second mode of operation, the selector switch 30 is placed in the "AC" position (FIG. 3). In this position, only switch contacts S1 will be closed, allowing relay coil R1 to be energized upon the closing of the gun switch 22. Because contacts 60 and S2 are both open at this point, no electric potential exists at wire 16; this condition is called a "cold tip" in the art, since welding can commence only when gun switch 22 is closed, thereby activating the control circuitry. Once the gun switch 22 is closed, relay coil R1 is energized, causing its associated set of relay contacts 58 to close. This completes a path in the 115 VAC control circuit 46 and energizes relay coil R2 which, in turn, closes its associated set of relay contacts 60. Electric potential now exists at wire 16, and welding operations can be commenced. It should be noted that as gun switch 22 is depressed, the wire feed motor 54 is simultaneously energized, feeding consumable welding wire 16 to the welding gun 20.

The third mode of operation is similar to the second mode of operation, except that no external source of welding current is available. By placing the selector switch 30 in the "INT" position, welding current is supplied directly by the 115 VAC terminal board 44 through the 115 V/24 V step-down transformer T1. Transformer T1 is connected to the positive welding conductor through selector switch contacts S3 and S4. Again, the operation of the control circuitry is the same as that of the second mode, except power is not fed to the receiving terminal post 76, but is supplied through transformer T1.

Figure 4:
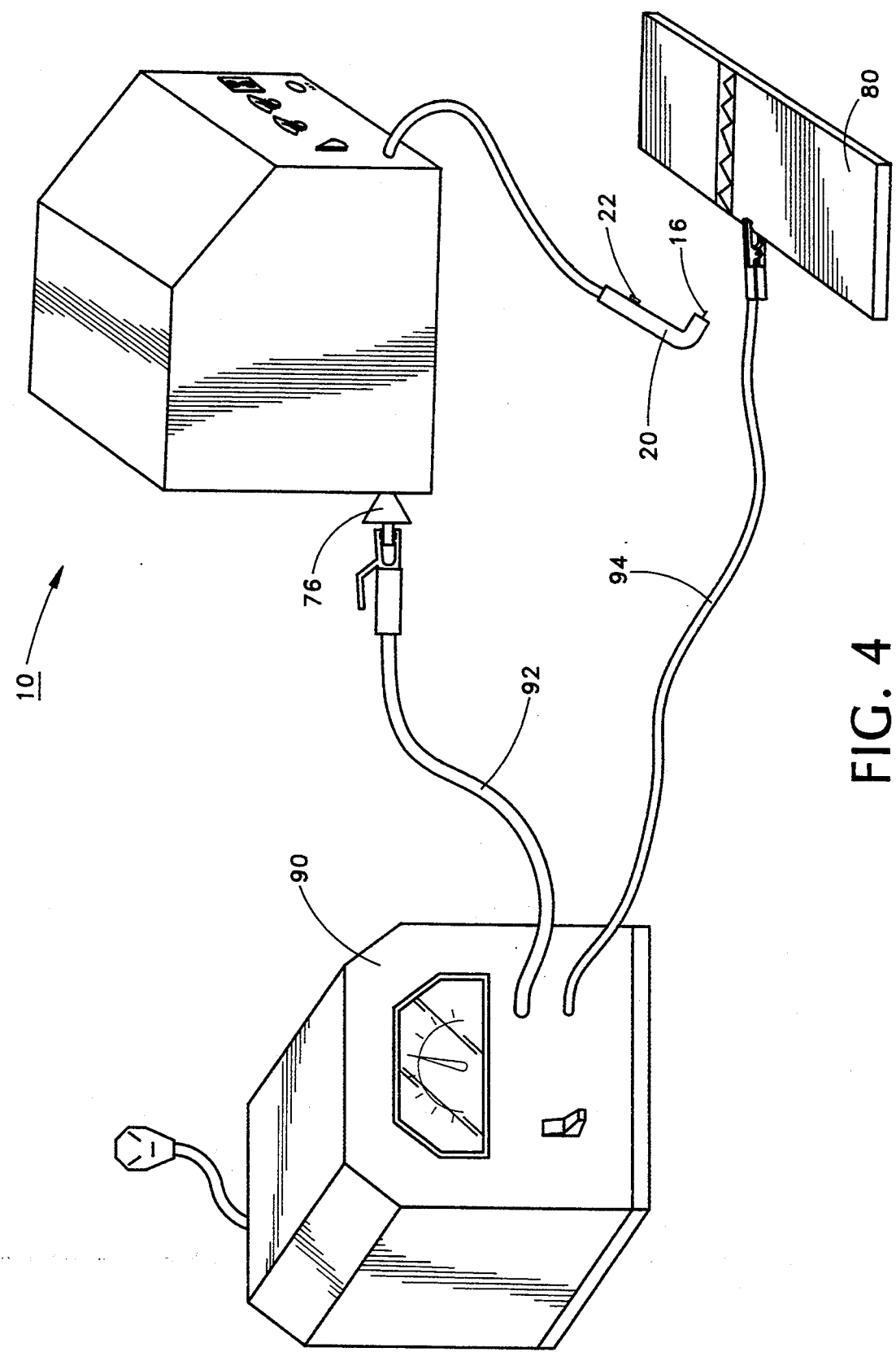
FIG. 4 is an isometric view of the welder in use in an AC current mode.

FIG. 4 illustrates the wire feed mechanism for welder 10. Wire 16 is drawn from a rotatable supply spool 130 by the engagement of the wire 16 with a drive wheel 132 rotated by wire feed motor 60 (also FIG. 2). Firm engagement of wire 16 with drive wheel 132 on one side of the wire 16 is maintained by a pressure wheel 134 bearing against the opposite side of the wire 16. Pressure wheel 134 is rotatably mounted at the distal end of arm 140 which is rotatably attached at flange 142 to the base of cabinet 12. Pressure wheel 134 is biased against wire 16 by means of a spring 144 compressably disposed between an intermediate portion of arm 140 and the base of cabinet 12. Wire 16 is maintained in position between drive wheel 132 and pressure wheel 134 by inlet and outlet guide cones 150 and 152, respectively, the guide cones being supported vertically by posts 154 and 156, respectively, flexibly joined to the guide cones and joined to the base of cabinet 12 by swivels 158 and 160, respectively. Outlet guide cone 152 is formed as an extension of flexible conduit 14.

Welder 10 is simple in construction, is compact, and can be economically manufactured from conventional components.

If desired, welder 10 may be arranged, using conventional components known in the art, to provide a shielding gas at the distal end of wire 16 (FIG. 1).

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A portable wire feed electric arc welder, comprising:
    a cabinet;
    a welding gum connected to the cabinet through a flexible conduit;
    supply means to continuously feed said wire to said welding gun;
    means to receive either AC or DC power into said welder;
    a selector switch having a plurality of contacts associated therewith;
    a 12 VDC control circuit having a first relay coil connected in series with a first set of said plurality of contacts;
    a 115 VAC control circuit having a second relay coil connected in series with a first set of relay contacts associated with said first relay coil, said second relay coil becoming energized and closing a second set of relay contacts whenever said first set of relay contacts are closed by energization of said first relay coil;
    a second set of said plurality of said contacts connected in parallel with said second set of relay contacts associated with said second relay coil, both of which are connected in series between a power source and a positive welding conductor;
    a third set of said plurality of contacts connected to the primary side of said step-down transformer and a fourth set of said plurality of contacts connected to the secondary of said step-down transformer;
    whereby in a first mode of operation, said selector switch is placed in a first position, causing said second set of said plurality of contacts to be closed, thereby creating electric potential at said positive welding conductor;
    in a second mode of operation, said selector switch is placed in a second position, causing said first set of said plurality of contacts to be closed, thereby creating electric potential at said positive welding conductor only when said first relay coil is energized; and
    in a third mode of operation, said selector switch is placed in a third position, causing said first, third, and fourth sets of said plurality of contacts to be closed, thereby creating electric potential at said positive welding conductor only when said first relay coil is energized.

2. A portable wire feed electric arc welder, as defined in claim 1, wherein said supply means to feed said wire to said welding gun comprises:
    (a) a rotatable supply spool from which said wire can be drawn;
    (b) a rotatable drive wheel driven by a wire feed motor to engage a first side of said wire and draw said wire from said supply spool; and
    (c) a rotatable pressure wheel to engage and bear against a second side of said wire, opposite said first side, to maintain firm engagement of said wire with said drive wheel.

3. A wire feed electric arc welder, as defined in claim 2, wherein said pressure wheel is rotatably mounted at the distal end of an arm which is rotatably attached to a cabinet in which said supply means is mounted and said pressure wheel being biased against; said wire by means of a spring compressably disposed between an intermediate portion of said arm and said cabinet.

4. A portable wire feed electric arc welder, as defined in claim 3, wherein said means to receive either AC or DC power into said welder comprises a conducting power terminal post disposed on a back surface of said cabinet, allowing a power cable to be clamped thereon.

* * * * *